Patented Nov. 14, 1944

2,362,612

UNITED STATES PATENT OFFICE 2,362,612

PROCESS FOR THE SULPHONATION OF TOLUENE

William B. Brown, Westmont, N. J., assignor to Allied Chemical & Dye Corporation, New York, N. Y., a corporation of New York No Drawing. Application March 6, 1942, Serial No. 433,594

6 Claims. (Cl. 260—505)

This invention relates to a process for the sulphonation of toluene, more particularly to a process for the sulphonation of toluene to produce a product comprising chiefly p-toluene sulphonic acid.

As is well known, aromatic sulphonic acids are usually obtained by the reaction of sulphuric acid upon aromatic hydrocarbons at elevated temperatures; for example, Tyrer Patent 1,210,725 of January 2, 1917, refers to sulphonation of aromatic hydrocarbons such as benzene by heating liquid benzene and strong sulphuric acid in a reflux apparatus. It was soon recognized, however, it was essential for economic and efficient operation that water generated by the sulphonation be selectively removed from the reaction zone by simple mechanical means; the method referred to in the Tyrer patent for sulphonating benzene has been found unsatisfactory because the vapors of benzene and water evolved from the refluxing mixture, upon condensation, do not separate into benzene and water layers, and accordingly selective mechanical separation of water from the benzene is impossible.

As a result of the disadvantages of the above method it was proposed to carry out the sulphonation of aromatic hydrocarbons by passing vapors of the aromatic hydrocarbon to be sulphonated through hot sulphuric acid at temperatures well above the boiling point of the hydrocarbon, the quantity of vapors passed through the acid being sufficient to convert the sulphuric acid to the desired aromatic sulphonic acid and at the same time sweep the water generated by the sulphonation out of the reaction vessel. This method has been found to be particularly suitable for the sulphonation of benzene.

Since p-cresol on condensation with formaldehyde forms resins of superior color stability as compared with those obtained from o- or m-cresols, this cresol is and has been greatly in demand. By analogy with synthetic methods of preparing phenol ($C_6H_5OH$) the simplest method of preparing synthetic p-cresol might be expected to involve the steps of sulphonating toluene to produce p-toluene sulphonic acid, neutralizing the sulphonic acid thus formed, fusing the p-toluene sulphonate with a strong alkali to form an alkali p-cresolate and recovering p-cresol from the cresolate. However, when it was attempted to apply the usual vapor phase benzene sulphonation method to the sulphonation of toluene for the production of p-cresol, unforeseen difficulties arose. While the relatively high temperatures required for vapor phase sulphonation minimized the amount of o-toluene sulphonic acid formed and also favored rapid completion of the reaction, the amount of m-toluene sulphonic acid formed was large and considerable quantities of ditolyl sulphone were formed. The production of o-toluene sulphonic acid is a disadvantage that can be tolerated, since the resultant o-cresol produced therefrom can be separated by fractionation from the desired p-cresol; m-cresol, however, cannot be separated from p-cresol by conventional fractionation procedures and no economical method of separating m-toluene sulphonic acid from p-toluene sulphonic acid is known, so that formation of m-toluene sulphonic acid during the sulphonation with the consequent production of m-cresol therefrom as an impurity in the p-cresol product is highly disadvantageous. Furthermore, the production of ditolyl sulphone not only represents a loss of toluene and sulphuric acid as far as cresol production is concerned, but the presence of the sulphone in the sulphonic acid interferes with the efficient operation of the subsequent fusion step.

An article in the "Journal of the Chemical Society," vol. 117, pages 1405–1407 (1920) indicates p-toluene sulphonic acid may be prepared by mixing toluene containing a small amount of iodine with the calculated quantity of concentrated sulphuric acid and heating the mixture at 100° C. for about one hour. I have found, however, that this method of preparing p-toluene sulphonic acid is of little value from a commercial standpoint because of the fact that the final product still contains about 28% of unreacted sulphuric acid or about 50% of the original sulphuric acid employed; obviously, a process in which the sulphonating agent is so incompletely utilized could not advantageously be adapted to commercial operation.

An object of my invention is to provide a new and improved process for the sulphonation of toluene.

A more specific object of my invention is to provide a process whereby toluene may be sulphonated in an economical manner to yield chiefly p-toluene sulphonic acid.

Another object of my invention is to provide an economical process for the sulphonation of toluene in which the sulphuric acid is almost completely consumed, while substantially no ditolyl sulphone and only a small percentage of m-toluene sulphonic acid are formed.

I have made the surprising discovery that toluene may be reacted with sulphuric acid in a manner permitting substantially complete utilization of the sulphuric acid and the production of a product comprising chiefly p-toluene sulphonic acid and containing only a small proportion of m-toluene sulphonic acid by refluxing a mixture of toluene and concentrated sulphuric acid, condensing the vapors evolved from the mixture, separating water therefrom, returning toluene to the reaction mixture and refluxing the mixture until an amount of water equivalent to the amount present in the sulphuric acid plus at least about 40%, preferably between about 40% and about 75%, and more particularly between about 70% and about 75%, of the theoretical amount of water of reaction has been removed. By operating in this manner I have found that a reaction product may be obtained containing toluene sulphonic acids of which at least 75% is p-toluene sulphonic acid and which contains not more than a trace of di-tolyl sulphone and less than 1% of sulphuric acid. In accordance with the preferred embodiment of my invention, concentrated sulphuric acid is added gradually with vigorous agitation to an amount of refluxing toluene in excess of that theoretically required to react with the acid, the toluene and water vapors evolved from the reaction mixture are condensed, water is separated from the toluene in the condensate by permitting the condensate to form water and toluene layers, the toluene thus recovered returned to the reaction mixture, and the mixture refluxed until an amount of water equivalent to the amount present in the acid plus between about 40% and about 75%, and more particularly between about 70% and about 75%, of the theoretical amount of water of reaction has been removed; by operating in this manner I have found particularly high yields of p-toluene sulphonic acid are obtained. However, it will be understood that this reaction may be carried out by mixing concentrated sulphuric acid with an amount of toluene in excess of that theoretically required to react with the acid and refluxing the mixture as above described until the required amount of water has been removed. By operating in accordance with my invention I have found substantially all the sulphuric acid is consumed, thereby making the process highly satisfactory from an economic viewpoint. Furthermore, since the product obtained comprises chiefly p-toluene sulphonic acid, and contains only small amounts of m-toluene sulphonic acid, p-cresol of satisfactory commercial purity may be readily obtained therefrom, thus satisfying the demand for this product.

In view of the lack of success of the liquid phase benzene sulphonation hereinabove described, which met with failure from an economic standpoint because water did not separate upon condensation of the benzene-water vapors evolved from the mixture, it is surprising that my process permits almost complete utilization of sulphuric acid when an appreciable amount of water is still present in the mass by selective mechanical removal of water from the condensed distillate, not only at the beginning of the sulphonation but up to the end thereof when the amounts of water evolved are considerably less. It is even more surprising that in addition my process is most favorable for high p- and low m-toluene sulphonic acid production and practically eliminates formation of ditolyl sulphone.

In carrying out my invention in accordance with the preferred embodiment thereof, an amount of concentrated sulphuric acid containing, for example, about 80% or more $H_2SO_4$, preferably between about 90% and about 95% $H_2SO_4$, is gradually added to an amount of refluxing toluene in excess of the amount theoretically required to react with the sulphuric acid; preferably, an amount of toluene between about 50% and about 100% in excess of that theoretically required to react with the sulphuric acid and sufficient to maintain the temperature of the reaction mixture below about 115° C. is employed. It is important that the reaction mixture be vigorously agitated, which may be accomplished by a high-speed propeller stirrer set at the acid-toluene interface. If desired the sulphuric acid may be preheated to about the refluxing temperature of toluene prior to addition thereof to the reaction mixture. The pressure at which the sulphonation is carried out may vary, but atmospheric or subatmospheric pressures are preferred; I have found p-toluene sulphonic acid of a particularly high purity may be obtained by carrying out my process at subatmospheric pressures of the order of 280 mm. of mercury. The vapor mixture of toluene and water evolved from the refluxing mixture is condensed, the condensate permitted to stratify, water separated therefrom and discarded, and toluene returned to the refluxing mixture. Refluxing of the reaction mixture in this manner is continued until an amount of water equivalent to the amount present in the sulphuric acid plus at least about 40%, preferably from about 40% to about 75%, and more particularly between about 70% and about 75%, of the theoretical amount of water of reaction has been removed, at which point sulphonation of the toluene is substantially complete; ordinarily between about five and about fifteen hours of refluxing are required.

The process of my invention may also be carried out by mixing concentrated sulphuric acid containing, for example about 80% $H_2SO_4$, preferbaly between about 93% and about 95% $H_2SO_4$, with an amount of toluene from about 50% to about 100% in excess of that theoretically required to react with the sulphuric acid and sufficient to maintain the temperature of the mixture when refluxed below about 115° C., refluxing this mixture, condensing the toluene-water vapors evolved, separating the water layer from the condensate, returning the toluene layer to the reaction mixture and refluxing the mixture until an amount of water equivalent to the amount present in the acid plus at least about 40%, preferably from about 40% to about 75%, and more particularly between about 70% and about 75%, of the theoretical amount of water of reaction has been removed.

The mixed sulphonic acids obtained in accordance with my invention comprise at least about 75%, and usually about 85%, p-toluene sulphonic acid. The average amounts of m-toluene sulphonic acid and o-toluene sulphonic acid, as determined by the composition of the mixed cresols obtained by fusing the toluene sulphonic acid salts with a strong alkali, are only from 2% to 5% and 10% to 20% of the product respectively. These results are in striking contrast to the results obtained by passing toluene vapor through sulphuric acid at elevated temperatures, whereby amounts of m-toluene sulphonic acid as high as one-third of the amount of p-toluene sulphonic acid have been formed. Only traces of di-tolyl sulphone are present in the product. Furthermore, my process is far superior to that described in the "Journal of the Chemical Society" in that products may be obtained containing less than 1% unreacted sulphuric acid equivalent to less than about 2% of the sulphuric acid employed, as contrasted with 28% sulphuric acid remaining in the product of the above article equivalent to about 50% of the sulphuric acid employed. The toluene sulphonic acid products of my invention may be treated as desired; for example, they may be dried or may be utilized directly for the production of p-cresol or other products derivable therefrom.

The following examples are illustrative of my invention; amounts are given in parts by weight.

Example 1.—65 parts of toluene were heated to refluxing and 45 parts of 93% sulphuric acid were added gradually to the refluxing toluene over a period of 35 minutes while thoroughly agitating the mixture. The vapors evolved from the reaction mixture were condensed, the water layer discarded and the toluene returned to the reaction mixture. Refluxing and agitation were continued until an amount of water equivalent to the amount present in the sulphuric acid plus 66% of the theoretical amount of water of reaction had been removed, which required 7⅙ hours. The mixed sulphonic acids thus obtained were found to contain 82.5% p-toluene sulphonic acid, 10.0% o-toluene sulphonic acid and 3.9% m-toluene sulphonic acid; the product contained 3.6% $H_2SO_4$ and the di-tolyl sulphone content was too small to be determined.

Example 2.—400 parts of 95% sulphuric acid and 624 parts of toluene were mixed and the mixture refluxed with thorough agitation, the vapors evolved from the mixture being condensed, the water layer discarded and the toluene returned to the reaction mixture. When an amount of water equivalent to the amount present in the sulphuric acid plus 71.5% of the theoretical amount of water of reaction had been removed, which required 9⅝ hours, refluxing was discontinued. The mixed sulphonic acids thus obtained were found to contain 78.8% p-toluene sulphonic acid, 17.8% o-toluene sulphonic acid and 2.7% m-toluene sulphonic acid; the product contained only 0.7% $H_2SO_4$ and the ditolyl sulphone content was too small to be determined.

Example 3.—A mixture of 609 parts of toluene and 294 parts of 95% sulphuric acid was vigorously agitated and refluxed at an absolute pressure of 280 mm. of mercury; the refluxing temperature was 80° C. The toluene and water vapors evolved were condensed, the water layer discarded and the toluene returned to the reaction mixture. Refluxing and agitation were continued until an amount of water equivalent to the amount present in the sulphuric acid plus 70% of the theoretical amount of water of reaction had been removed in this manner, which required 13 hours. The ratio of p-toluene sulphonic acid to m-toluene sulphonic acid in the reaction mixture was found to be 97.5 to 2.5.

In the above examples the sulphonic acid analyses were determined by analyzing the cresols derived from the sulphonic acid mixture by neutralizing the acids, fusing the sulphonates with sodium hydroxide and liberating the cresols from the cresolates thus formed.

In view of the above description it will be evident that my invention has provided a new and improved process for the manufacture of p-toluene sulphonic acid.

Since certain changes may be made in carrying out the above process without departing from the scope of the invention, it is intended that all matter contained in the above description shall be interpreted as illustrative and not in a limiting sense.

I claim:

1. A process for the sulphonation of toluene to produce a product comprising chiefly p-toluene sulphonic acid which comprises refluxing a mixture of liquid toluene and concentrated sulphuric acid, the amount of toluene being in excess of that required to react with the acid, condensing the vapors evolved, separating water from the condensate, returning toluene thus recovered to the reaction mixture and refluxing the mixture until an amount of water equivalent to the amount present in the sulphuric acid plus from about 40% to about 75% of the theoretical amount of water of reaction has been removed.

2. A process for the sulphonation of toluene to produce a product comprising chiefly p-toluene sulphonic acid which comprises refluxing a mixture of liquid toluene and concentrated sulphuric acid, the amount of toluene being in excess of that required to react with the acid, condensing the vapors evolved, separating water from the condensate, returning toluene thus recovered to the reaction mixture and refluxing the mixture until an amount of water equivalent to from about 70% to about 75% of the theoretical amount of water of reaction has been removed.

3. A process for the sulphonation of toluene in the liquid phase to produce a product comprising chiefly p-toluene sulphonic acid which comprises gradually adding concentrated sulphuric acid to an amount of refluxing toluene in excess of that theoretically required to react with the acid, agitating and refluxing the mixture, condensing the vapors evolved, stratifying the condensate to form water and toluene layers and returning the toluene to the reaction mixture, and refluxing the reaction mixture until an amount of water equivalent to the amount present in the sulphuric acid plus from about 70% to about 75% of the theoretical amount of water of reaction has been removed.

4. A process for the sulphonation of toluene to produce a product comprising chiefly p-toluene sulphonic acid which comprises mixing concentrated sulphuric acid with an amount of liquid toluene in excess of that theoretically required to react with the acid, refluxing the mixture with agitation, condensing the vapors evolved, separating water from the condensate, returning toluene thus recovered to the reaction mixture and refluxing the mixture until an amount of water equivalent to the amount present in the sulphuric acid plus from about 70% to about 75% of the theoretical amount of water of reaction has been removed.

5. A process for the sulphonation of toluene in the liquid phase to produce a product comprising chiefly p-toluene sulphonic acid which comprises gradually adding concentrated sulphuric acid to an amount of refluxing toluene in excess of that theoretically required to react with the acid, agitating and refluxing the mixture, condensing the vapors evolved, stratifying the condensate to form water and toluene layers and returning the toluene to the reaction mixture, and refluxing the reaction mixture until an amount of water equivalent to the amount present in the sulphuric acid plus from about 70% to about 75% of the theoretical amount of water of reaction has been removed, said process being carried out at subatmospheric pressure.

6. A process for the sulphonation of toluene to produce a product comprising chiefly p-toluene sulphonic acid which comprises mixing concentrated sulphuric acid with an amount of liquid toluene in excess of that theoretically required to react with the acid, refluxing the mixture with agitation, condensing the vapors evolved, separating water from the condensate, returning toluene thus recovered to the reaction mixture and refluxing the mixture until an amount of water equivalent to the amount present in the sulphuric acid plus from about 70% to about 75% of the theoretical amount of water of reaction has been removed, said process being carried out at subatmospheric pressure.

WILLIAM B. BROWN.